United States Patent Office 3,309,203
Patented Mar. 14, 1967

3,309,203
METHOD FOR REDUCING FERMENTATION TIME OF BREAD DOUGH
Carl J. Jensen, Cedar Grove, N.J., assignor to Shield Laboratories, Inc., Montclair, N.J., a corporation of New Jersey
No Drawing. Filed Aug. 8, 1963, Ser. No. 300,924
5 Claims. (Cl. 99—91)

This invention relates to the manufacture of bread and bread-like products and particularly to such products which undergo leavening.

Bread-like products are made by two different systems. In the sponge process, the yeast is allowed to work in a batterlike mixture of flour, water and sugar before combining with the other ingredients. In the straight dough process, all the ingredients are mixed at one time. The quality of the bread is determined in large measure by the condition of the gluten. The gluten is formed by combining glutenin and gliadin, the proteins in flour, with water. The gluten has a rubbery characteristic which is altered by fermentation. The gluten, when dispersed in the dough, produces a cellular foam-like structure by the action of the yeast. The firmness of this cellular structure depends on the strength and extensibility of the cell walls.

In this specification, the term "flour" is intended to mean edible flour comprising proteins, starch and minerals. Typical of such flours are whole wheat, bolted white, rye, graham and the like. Most flour used for making bread-like products are all-purpose flour made from a combination of hard and soft wheat. As a general rule, the harder the wheat the longer the time required for leavening.

It had become common practice in the baking industry to employ certain agents for their effect on the maturing or aging of the dough during yeast fermentation. Such additions have both improved the products and resulted in economics in manufacture. Cystine has commonly been used to reduce the sponge time as well as the sugar and yeast requirements. Cystine also has beneficial properties in improving the color, texture, aroma and flavor. The amount of cystine utilized depends in large measure on the particular composition, but usually about one and one-half to two and a half grams per hundred grams of flour is sufficient. The addition of cystine softens the dough which makes it desirable when harder flour is used. The softening is presumably due to hydrolysis of the gluten which tends to render the dough more plastic and apparently more fluid.

In present day commercial practices, the physical characteristics of the dough are very important. As an illustration of this, the operation of automatic extrusion equipment requires a dough having high strength and shear resistance. The use of automatic equipment also causes the time required for fermentation to be of great importance. Any decrease in fermentation or sponge time can render substantial economics in commercial operations.

U.S. Patent 2,434,087, issued January 6, 1948, to Frederick C. Weber, discloses the use of a hydrolysate of protein material including cystine in producing leavened bread. The cystine acts as an improver of the bread whereas the hydrolysate is a nutritional supplement. Such a bread has a high nutritional value. The composition of the hydrolysate, however, can vary widely because of the type of protein and method of hydrolysis. Additionally, the quantity of amino acids in a particular protein source varies. The results obtained in using such a hydrolysate are not consistently reproducible and cause a serious detriment to the uniformity of quality of the bread dough and resulting baked products.

The primary object of the invention is to provide an additive for bread-like compositions which substantially decreases the time required for fermenting dough. Another object of the invention is the provision of a dough composition for forming bread-like products which will ferment rapidly. A further object is to provide such a dough which will yield a bread-like product of excellent color, flavor, and uniform grain structure. A still further object is to provide a fermented dough of high mechanical strength and shear resistance. An additional object of the invention is the provision of an improved process for producing bread-like products. Other objects and the advantages of the invention will appear from the following detailed description.

In accordance with the invention, it has been discovered that the addition of substantially pure methionine (2-amino-4-methylthiobutanoic acid) to bread-making ingredients prior to or during mixing kneading materially decreases the sponge time or the fermentation period required for the manufacture of bread-like products. This reduction in fermentation time is a minimum of twenty-five percent and can amount to as much as seventy-five percent less fermentation time. The methionine is preferably the racemic mixture of the d and l forms, but it can also be the levo- or the dextro-rotary form. The reason for this desirable acceleration of the fermentation is not known. It would not be expected that methionine would act in a manner similar to cystine and cysteine because of its distinct structural difference. Cystine is a disulfide and crysteine acts like a disulfide in that it usually exists in the chelated ring structure. Additionally, methionine is about twice as fast in fermenting dough as cystine and cysteine. This substantial reduction in the fermentation cycle makes the use of methionine ideally suited for commercial operations where time is a critical factor in economic operation.

The addition of methionine to the ingredients in the manufacture of bread-like products has further advantages. The reduction in fermentation time represents material savings in sugar and yeast and an increase in residual sugar. The strength of the dough is remarkably high as well as its shear resistance which makes it particularly suitable for use with extrusion machines and other high speed processing equipment. The methionine apparently gives better and more uniform hydrolization of the gluten since its use results in good plasticity in the dough and a more uniform and smoother grain structure in the baked product. The baked product also has fine flavor and aroma as well as excellent internal and surface color.

The improved results obtainable in accordance with the invention are accomplished with as little as 0.1 gram of methionine for each one hundred pounds of flour used in the dough. Usually, the maximum amount of methionine should not exceed about five grams per one hundred pounds of flour. Above about 5.0 grams, the action is so rapid and intense that it is difficult to control. For making bread, a range of about 0.2 to about 1.0 gram is preferred. The methionine is conveniently added in a mixture of starch and sugar, such as corn sugar. A particularly useful range is about 25 to 75 percent starch and about 25 to 75 percent sugar with about 0.5 to 2.0 grams of methionine being used with each ounce of the mixture. The methionine can be used with the sponge system of bread manufacture or the straight dough process. As indicated, the addition of the methionine can take place initially or it can be added at any stage of the mixing. After the addition of the methionine, the composition is thoroughly mixed to uniformly disperse the compound. This is essential to attain good cell structure. The dough composition is then placed in a suitable container and the fermentation process allowed to proceed. It is usually necessary to hold the dough at a temperature of about 80 to 90° F. for proper leavening. The fermented dough is cut into the desired shape and then placed in pans and baked. It is customary practice to allow the dough to relax after it is cut into the desired shape and prior to baking. The temperature of the oven and the baking time will depend on the particular composition of the dough. Usually baking is completed in twenty to forty minutes. If an automatic extruder is utilized, the fermented dough is placed in the hopper and extruded in the desired shape and then cut into proper length.

The following examples are given for purposes of illustration:

Example 1.—White bread

A bread dough having the following composition is prepared:

| | Pounds |
|---|---|
| White patent flour | 100.0 |
| Sugar | 8.0 |
| Milk powder | 5.0 |
| Shortening | 3.0 |
| Regular yeast | 3.0 |
| Yeast food salts | 0.5 |
| Salt | 2.0 |
| Water | 60.0±2 |

The flour, sugar, milk powder, shortening, salt and yeast salts are placed in a mixer. A mixture of 0.4 gram of dl-methionine, 0.2 ounce of starch and 0.3 ounce of corn sugar are then added to the mixer. The yeast is dissolved in a portion of the water and this solution and the remainder of the water is added to the mixer. The ingredients are mixed for about 15 minutes until smooth. The dough is removed from the mixer, placed in a fermentation trough and allowed to ferment. The dough requires 45 minutes for fermentation. The dough is then divided into one-pound segments. The dough is allowed to rise for about ten minutes and then is rolled out, molded to form the proper size and placed in a baking pan. The dough is allowed to rise in the pan for about 50 minutes under conventional controlled conditions of temperature and humidity. The loaf is then baked for approximately thirty minutes. The finished loaf has excellent color, flavor and aroma. In addition, the loaf has unusually uniform and fine grain structure. The dough produced has excellent molding characteristics and improved sheeting properties without becoming sticky or tacky. The loaf is smooth and uniform from end to end without undue molding pressure which helps assure its uniform grain structure. The identical procedure was followed using 0.4 gram of cystine in place of the dl-methionine. The time required for fermentation was about twice as long.

Example 2.—Sweet dough

A dough having the following composition was formed:

| | Pounds |
|---|---|
| White patent flour | 100.0 |
| Milk powder | 3.0 |
| Sugar | 20.0 |
| Shortening | 20.0 |
| Regular yeast | 8.0 |
| Salt | 1.75 |
| Eggs | 15.0 |
| Water | 50.0±2 |

The flour, sugar, milk powder, salt, shortening and eggs are placed in a mixer. A mixture of one gram of dl-methionine and one ounce of equal portions of starch and corn sugar is then added to the mixer. The yeast is dissolved in a portion of the water and the solution with the remainder of the water is added to the mixer. The ingredients are mixed for about 15 minutes and then removed from the mixer and placed in a fermentation trough. The dough is allowed to ferment for one hour. The fermented dough is placed in a hopper of an extrusion machine. The dough is forced through a nozzle in a continuous strip onto a moving belt. The dough is allowed to relax and is then made up into the finished product by the addition of fruit jams, fillings, raisins or the like. The finished dough is then baked. The baked product has excellent flavor and fine uniform texture.

Following the same procedure, utilizing one gram of cystine, it was necessary to let the dough ferment for three hours.

Any departure from the foregoing description which conforms to the invention is intended to be included within the scope of the claims.

What is claimed is:

1. A method for reducing fermentation time in making leavened bread and bread-like products consisting essentially of mixing with the bread dough from about 0.1 to about 5.0 grams of substantially pure methionine for each one hundred pounds of flour in said dough and then allowing the mixture to ferment.

2. The method of claim 1 wherein said methionine is the racemic mixture.

3. A method for reducing fermentation time in making leavened bread consisting essentially of mixing with the bread dough about 0.2 to about 2.0 grams of dl-methionine for each one hundred pounds of flour in the dough and then allowing the mixture to ferment.

4. A method for reducing fermentation time in making leavened bread and bread-like products consisting essentially of mixing together water, sugar, yeast, flour and about 0.1 to about 5.0 grams of substantially pure methionine for each one hundred pounds of flour, allowing the mixture to ferment, molding the fermented mixture into the desired shape and baking the shaped mixture.

5. A method for reducing fermentation time in making leavened bread and bread-like products consisting essentially of mixing with bread dough free of cystine about 0.1 to about 5.0 grams of methionine per one hundred pounds of flour in said dough and then allowing the mixture to ferment.

References Cited by the Examiner

UNITED STATES PATENTS 2,434,087 1/1948 Weber _____ 99—90
2,828,207 3/1958 Fullhart _____ 99—90

A. LOUIS MONACELL, *Primary Examiner.*

BEATRICE H. STRIZAK, S. J. BAICKER, J. M. GOLIAN, A. E. TANENHOLTZ, *Assistant Examiners.*